March 6, 1956 C. GORA 2,737,013
MACHINE FOR TRIMMING CHAIN LINKS
Filed April 20, 1954
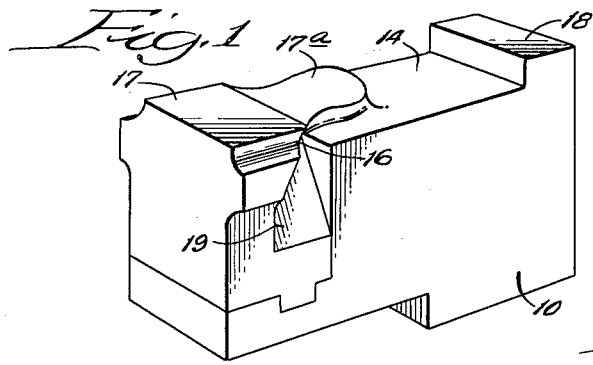
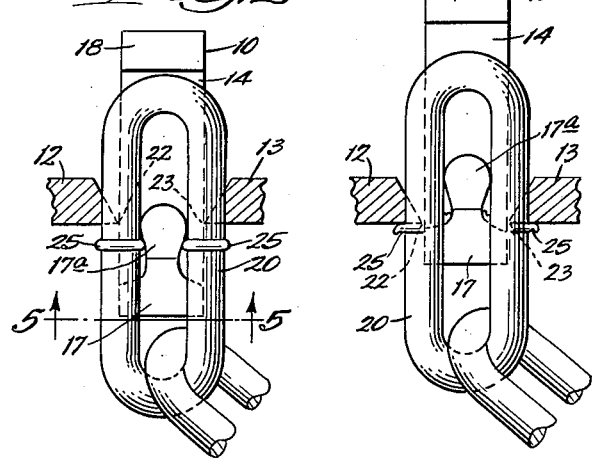
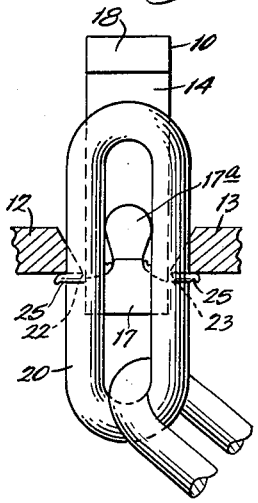
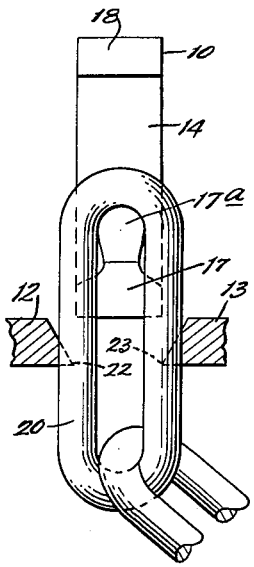
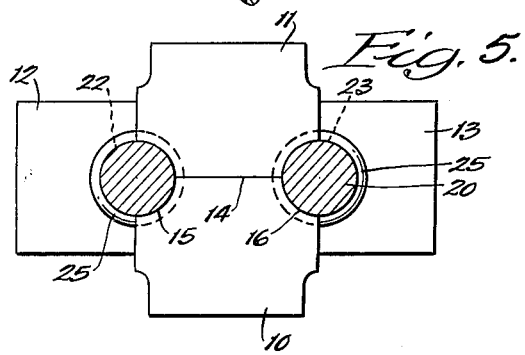
INVENTOR:
Chester Gora,
BY
Orme, McDougall, Williams & Hersh,
ATTORNEYS.

United States Patent Office 2,737,013
Patented Mar. 6, 1956

2,737,013

MACHINE FOR TRIMMING CHAIN LINKS

Chester Gora, Hammond, Ind., assignor to S. G. Taylor Chain Company, Hammond, Ind., a corporation of Illinois Application April 20, 1954, Serial No. 424,441

3 Claims. (Cl. 59—29)

This invention relates to the art of manufacturing chain, and in particular it is addressed to a machine for trimming from chain links, as they are manufactured, the bulges or fins commonly formed on such links as an incident to their being welded.

The particular type of chain links to which the present invention is addressed are links built up out of two U-shaped members abutted at their open ends and welded together. That type of link is being extensively manufactured at present, since chains built up out of such links can be more readily mass produced than with the older type of link having only a single weld.

Despite the advantages of the links made from two U-shaped stock pieces, however, they do present serious problems from the standpoint of trimming. These problems arise because the trimming must be accomplished promptly after the welding operation, while the metal is still hot and relatively plastic. Links built up from two pieces, and containing a weld in each leg, however, are structurally weak and subject to distortion at that time. This problem was not particularly serious in the older type of chain link wherein a single piece of stock was bent to form a closed loop and welded at only one point, since the structural strength of such a link was maintained, even during and following the welding operation, by the solid, unwelded side of the link.

The flanges or fins as they are sometimes called, which must be trimmed off of chain links are formed by the welding operation, in which the abutted ends of two U-shaped stock pieces are forced together under pressure and heated to a very high temperature by passage of electric current or otherwise. In bonding into an integral link, the heated metal flows outwardly from the abutted junction faces of the U-shaped stock pieces, leaving around the mid portion of each leg of the link the annular flange or fin above referred to.

Those flanges are undesirable in the completed chain for several reasons. For one thing, the metal of the flanges is usually oxidized to some extent and is hence unsightly, impairing the appearance of the link and giving to a casual observer the impression that it is not strong and sound. Also, the protruding flanges, having coarse and irregular surfaces, constitute a potential source of cuts and other injuries to persons handling the chain.

By the present invention, I have provided a convenient machine whereby the welding flanges can be entirely removed from freshly manufactured links while the metal is still hot and relatively plastic, without distorting the metal of the links or weakening their internal structure. To provide such a machine is the principal object of the present invention.

Another object of the present invention is to provide a chain-trimming machine in which both the inner and outer portions of the welding flanges are quickly and neatly trimmed away from the link in a single operation.

Other objects and advantages of the present invention will appear from the following detailed description of a typical embodiment.

The surprising result achieved by my present invention—namely, complete trimming of links without distorting the link structure or impairing its structural strength—is achieved by the novel cooperation of relatively movable die members wherein half the trimming operation is accomplished by shearing under compression and the other half is achieved by shearing under tension. Those oppositely acting forces remove the welding flanges without any appreciable effect on the shape or properties of the link itself, even though they take place while the metal is still hot and hence semi-plastic.

In the appended drawing I have shown a typical embodiment of a trimming machine according to my invention. The machine employs two pairs of symmetrical trimming dies, each pair being relatively movable with respect to the other pair. Fig. 1 is a perspective view showing a typical trimming die which provides a bed for the link and at the same time carries shearing surfaces for trimming the inside portion of the welding flanges. Fig. 2 is a plan view, partly in section, showing how a pair of the Fig. 1 dies receive a link to be trimmed. Fig. 2 also shows, in section, the pair of shearing dies which actually remove the outer portions of the weld flanges. Figs. 3 and 4 are generally similar to Fig. 1, but they show the relative positions of the dies during different stages of the trimming procedure. Fig. 5 is a side elevation view, also partly in section, showing the relative positions of the four dies after a link has been mounted in them to be trimmed.

Broadly speaking, my trimming machine comprises a pair of symmetrical dies 10 and 11. Fig. 1 is a perspective showing of such a die, occupying the position of element 10 in Fig. 5. Cooperating with dies 10 and 11 is a pair of dies 12 and 13, which are also symmetrical with respect to one another. The upper surface of die 10 and the corresponding lower surface of die 11 are shaped to provide a bed 14 between which a typical link 20 may be received, and the dies 10 and 11 carry arcuate shearing surfaces 15 and 16, machined into a raised boss 17 which extends above the level of bed 14 and flush with the upper surface of abutment 18, which extends along the forward end of dies 10 and 11.

As may be seen from Fig. 5, when the dies 10 and 11 are placed together with bosses 17 and abutments 18 in conjunction, a link 20 will fit snugly but slideably within the space between the bed surfaces 14.

Bosses 17 are provided with a narrow forward extension 17a which is shaped to conform generally to the arcuate inner surface of the link at the forward end thereof, and the dies 10 and 11 are also provided with a pair of recesses 19 immediately forward of the shearing or cutting edges 15 and 16.

As may be observed from Fig. 5, the shearing surfaces 15 and 16 are each formed to extend around one-quarter of the circumference of the cylindrical sides of the link 20, and the corresponding shearing surfaces 22 and 23 of dies 12 and 13 respectively are arcuately formed to extend around one-half of the circumference of the link sides.

The dies 10, 11, 12, and 13 may be mounted in any suitable support which will permit relative longitudinal movement of the dies 10 and 11, on the one hand, and the dies 12 and 13, on the other hand, and which will permit lateral retractile movement of the side shearing dies 12 and 13.

A freshly made link, still hot after being welded, may be placed on the bed 14 of die 10 and the corresponding mating die 11 is then moved into appropriate position over die 10, so that link 20 is held between the dies as shown in Fig. 5. At that time, the flanges or fins 25 resulting from the fresh welds lie within the recesses 19.

At that stage, the retractile dies 12 and 13 are advanced until they occupy the position shown in Figs. 2–5, and the shearing dies 12 and 13 are then moved relatively to the dies 10 and 11, as indicated in Figs. 3 and 4. The shearing edges 15 and 16 engage the inner portions of flanges 25 and thus hold link 20 while shearing edges 22 and 23 of the dies 12 and 13 engage the outer portions of flanges 25.

At this stage, the machine causes simultaneous application of oppositely directed shearing forces to the weld flanges 25, resulting in their being sheared off the link without introducing into the link any distorting forces, either of compression or tension, great enough to damage the link.

In the embodiment shown, the inner portions of the flanges 25 yield to the shearing force of cutting edges 15 and 16 more readily than the outer portions yield to the corresponding cutting surfaces of dies 12 and 13. This effect is achieved by shaping the cutting surfaces 15 and 16 so that they present an inclined or generally diagonal cutting edge to the inside portions of the weld flanges, while the dies 12 and 13 present cutting edges which are more nearly at a right angle to the direction of shear. As a result, the inner portions of flanges 25 yield first, whereupon the link 20 moves into abutment with extensions 17a, and the dies 12 and 13 finish the trimming operation by shearing off the outer portions of the weld flanges 25.

The result, as shown in Fig. 4, is a perfectly trimmed link from which the weld flanges have been entirely removed.

It will be understood that, if desired, the cutting edges of dies 10 and 11 may be formed to present cutting surfaces at right angles to the direction of movement, and similarly the cutting edges of the dies 12 and 13 may, if desired, be shaped to present angular cutting edges to the forwardly moving link.

With the arrangement shown, the inner portions of the welding flange are consistently sheared away ahead of the outer portions, so that dies 12 and 13 will invariably hold the link stationary until the inside shearing operations have been completed. If the cutting edges of the dies be so designed that the outer portions of the weld flanges are trimmed first, then some means must be provided for limiting the forward movement of link 20, to permit the dies 10 and 11 to complete the inside shearing operations. This could be done, for example, by placing the extension 17a on the opposite end of boss 17 from the cutting edges 15 and 16.

While I have in this specification described in considerable detail a particular embodiment of my invention, it is to be understood that that showing is intended to be exemplary only. Persons skilled in the art will be able to introduce numerous changes and variations in the structure illustrated without departing from the spirit of my invention.

I claim:

1. In a machine for trimming off of chain links the flanges produced by welding, a pair of symmetrical dies having mating corresponding faces, each of said faces being provided with a recess, each of said recesses having a depth substantially equal to one-half the thickness of the links to be trimmed and being shaped to provide, when said corresponding faces are in contact, a relieved zone adapted to receive said link and to hold it against lateral and radial movement while affording a limited range of longitudinal movement thereto, a pair of cutting edges on each of said dies disposed on the edges of said recess, said cutting edges being shaped to conform to the inner surfaces of said link and being positioned at an acute angle to the plane of a link received within said recesses and to the plane of the weld flange on the link, a second pair of dies mounted for cooperative action with said first pair of dies and being provided respectively with arcuate cutting edges shaped to fit the outer surfaces of said link, the angle between said last-named cutting edges and said first-mentioned plane being more nearly a right angle than said first-mentioned angle, the angle between the said last-named cutting edge and the plane of the flange being more nearly parallel than said first-mentioned angle, and means for moving said first-mentioned pair of dies relatively to said second pair of dies in the direction longitudinal of a chain link carried in said recesses, whereby said link is moved longitudinally with said first pair of dies until the outer portions of its welding flanges abut against said cutting edges on said second pair of dies and is thereupon held fixed relatively to said second pair of dies until after the cutting edges on said first pair of dies have trimmed away the inner portions of said welding flanges, the link thereupon being moved forward by said inner dies to effect shearing off of the outer portions of said welding flanges by said cutting edges on said second dies.

2. Apparatus according to claim 1 wherein each of said first pair of dies is provided with a second recess, communicating with said first recess and immediately adjacent said cutting edges, said second recess being adapted to accommodate the inner portions of said welding flanges before they have been sheared away.

3. In a machine for trimming off of chain links the flanges produced by welding, a pair of symmetrical dies having mating corresponding faces, each of said faces being provided with a recess, each of said recesses having a depth substantially equal to one-half the thickness of the links to be trimmed and being shaped to provide, when said corresponding faces are in contact, a relieved zone adapted to receive said link and to hold it against lateral and radial movement while affording a limited range of longitudinal movement thereto, a first pair of cutting edges on each of said dies disposed on the edges of said recess, said cutting edges being shaped to conform to the inner surfaces of said link and being positioned at an angle to the plane of a link received within said recesses and to the plane of the weld flange on the link, a second pair of dies mounted for cooperative action with said first pair of dies and having respectively a second pair of cutting edges shaped to fit the outer surfaces of said link, the angle between the cutting edges on one of said pairs of dies and said first-mentioned plane being more nearly a right angle than the angle between the cutting edges on said other pair of dies and said first-mentioned plane, and means for moving said first-mentioned pair of dies relatively to said second pair of dies in the direction longitudinal of a chain link carried in said recesses, whereby said link is moved longitudinally with one pair of said dies until its welding flanges abut against said cutting edges on said other pair of dies and is thereupon held fixed relatively to said other pair of dies until after the cutting edges on said one pair of dies have trimmed away portions of said welding flanges, the link thereupon being moved forward by said one pair of dies to effect shearing off of the remainder of said welding flanges by said cutting edges on said other pair of dies.

References Cited in the file of this patent

UNITED STATES PATENTS

| 2,125,967 | Taylor | Aug. 9, 1938 |

FOREIGN PATENTS

| 589,018 | Great Britain | June 9, 1947 |